July 10, 1934.     E. B. ENOCHSEN     1,966,339
ELECTRICAL MEANS OR DEVICE FOR HEATING WATER OR OTHER LIQUIDS
Filed Nov. 23, 1932     2 Sheets-Sheet 1

Witness:
Arthur Thompson

Inventor:
Esling Bernhard Enochsen

July 10, 1934.  E. B. ENOCHSEN  1,966,339
ELECTRICAL MEANS OR DEVICE FOR HEATING WATER OR OTHER LIQUIDS
Filed Nov. 23, 1932  2 Sheets-Sheet 2
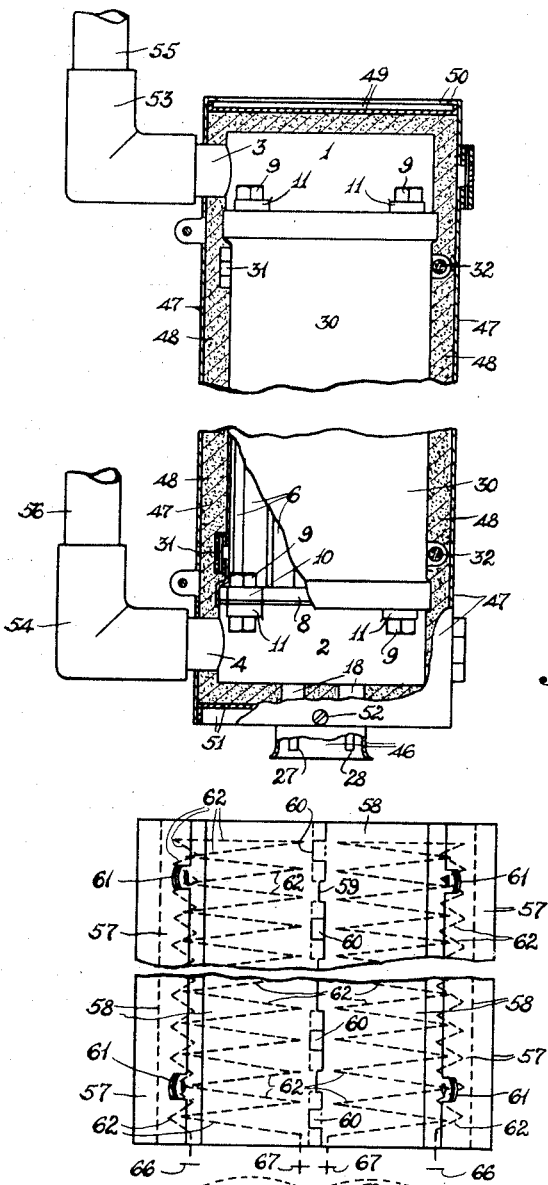
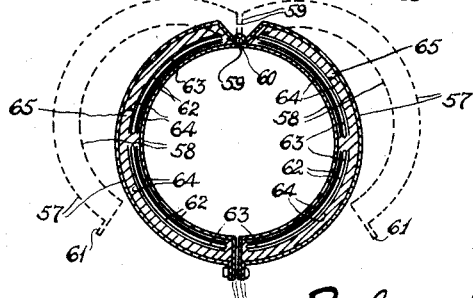
Witness:
Arthur Thompson
Inventor:
Erling Bernhard Enochsen Patented July 10, 1934

1,966,339

UNITED STATES PATENT OFFICE 1,966,339

ELECTRICAL MEANS OR DEVICE FOR HEATING WATER OR OTHER LIQUIDS

Erling Bernhard Enochsen, Germiston, Transvaal, Union of South Africa

Application November 23, 1932, Serial No. 644,039. In the Union of South Africa November 30, 1931

5 Claims. (Cl. 219—38)

This invention relates to an electrical heating means for water and other liquids.

The object of the invention is to design means of the nature indicated which is of simple construction, and is capable of heating the water quickly and at comparatively small cost.

The device can be operatively combined with a hot water supply arrangement or system in such a way that the water circulating or passing through the device will enter a receiving vessel, cistern, tank or reservoir from which the hot water can be drawn off as desired.

According to the invention the heating means includes upper and lower hollow, preferably annular, parts, which are connected by a plurality of water circulating tubes or pipes, which are connected at their lower ends to the bottom annular part, and at their upper ends to the top annular part, so that each of said tubes or pipes establishes communication between said upper and lower annular parts. The lower hollow annular part is provided with an inlet for the water to be heated, and the upper annular part with an outlet for the heated water.

The electrical element or elements is or are arranged concentrically of the circulating tubes or pipes and of annular formation in cross-section. The heating element or elements may be arranged centrally of the arrangement of circulating pipes or tubes or they may be arranged around the circulating pipes or tubes, or between the pipes and a casing enclosing the same, or around the inside of the surrounding casing.

The heating means is arranged and housed in a casing or container, which may include an external metal or other suitable rigid casing, which may be lined internally with a suitable heat-insulating material, such as, for example, asbestos. The casing may be of cylindrical or other suitable shape, preferably comprising hemi-cylindrical hinged sections, and be closed both top and bottom with suitably heat-insulated covers, either or both of which may be removable. The casing, or its heat-resisting lining, may, if desired, be provided interiorly with a copper or other, preferably polished, inner metal casing, coating or lining, around the tubes between the upper and lower hollow annular parts.

An opening is provided at or near the bottom of the external casing, through which passes the inlet pipe for conducting the water from the receiving vessel, cistern, tank or reservoir to the heating means, and a further opening is provided at or in proximity to the top of the external casing for the outlet pipe for the heated water to said receiving vessel, cistern, tank or reservoir.

The receiving vessel may be arranged around the heating means and comprise inner and outer cylindrical metal casings, forming an annular receiving space for the circulation of the water; or the water may be led from the heating means to any other conveniently positioned cistern, tank or reservoir.

The invention will be described in detail with the aid of the accompanying drawings. In the drawings, Fig. 1 is a part-sectional elevation of one form of the invention.

Fig. 3 is a part-sectional elevation of another arrangement of the invention.

Fig. 4 is a sectional plan illustrating a modified construction of the electrical elements of the heating means, and the hinged casings therefor, the casings being shown in dotted lines in an open position, and Fig. 5 is a front elevation of the construction shown in Fig. 4, with the casings in the open position.

Figure 1:
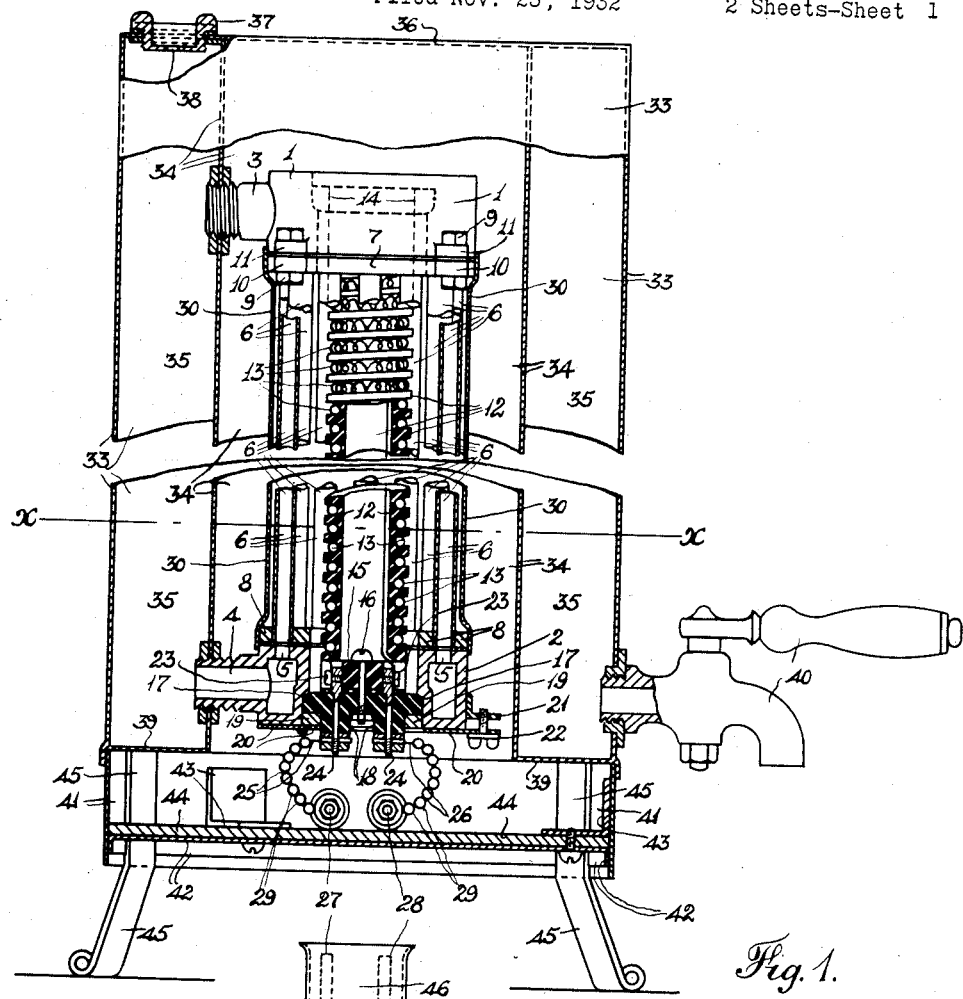
Figure 2:
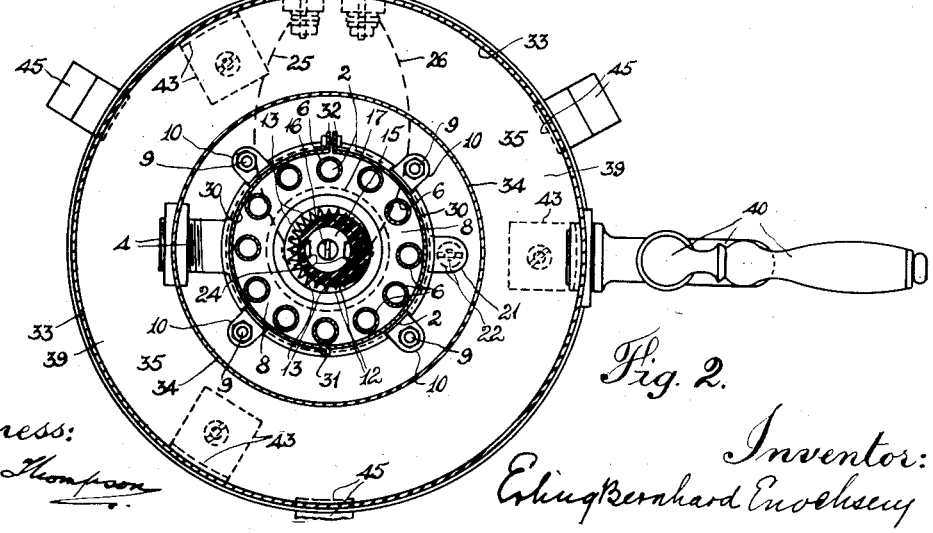
Fig. 2 is a sectional plan of Fig. 1, the plane of section being indicated by the dotted line x—x in Fig. 1.

In the construction illustrated in Figs. 1 and 2, 1 and 2 represent the upper and lower hollow annular parts respectively of the heating means. The part 1 is constructed with an outlet branch 3, which forms an outlet for the heated water, and the other part 2 with a branch 4 which forms the inlet for the water to be heated. In the underside of the top part 1, and in the upper side of the bottom part 2, there are formed holes or slots 5 which communicate with the annular interior space of the parts 1, 2. 6 are the circulating tubes or pipes which are positioned and fixed between the parts 1, 2, and communicate at opposite ends, through the holes or slots 5, with the annular spaces of the hollow parts 1, 2. 7, 8, are two rings in which the ends of the tubes 6 are secured. These rings 7, 8, are arranged next the parts 1, 2, respectively, and are secured thereto by bolts 9 which pass through coincident holes in lugs 10 formed on the rings 7, 8, and lugs 11 formed on the parts 1, 2. The pipes or tubes 6, parts 1, 2, and rings 7, 8, may be made of copper or other metal which is a good conductor of heat, so that the heat is quickly transmitted to the water in its passage therethrough.

In this construction the heating element is arranged centrally of the ring of tubes 6. It comprises a hollow insulating piece or tubular core 12, spirally grooved externally to receive the coiled resistance wire 13. The core 12 is kept in a central position at the top by means of a ring 14 which fits a recess in the top of the part 1. At the lower end the electrical element is secured upon an insulating block 15 by a screw 16. The block 15 is fitted in a recess 17 in the underside of the bottom part 2. 18 are two bosses or projections formed on the block 15; 19 being a packing ring arranged in the recess 17, around the bosses 18, and between the block 15 and a hinged bottom cover plate 20. 21 is a bracket and 22 a thumbscrew for holding the cover plate 20 in the closed position to support the electrical element. The ends of the resistance wire 13 are attached by screws 23 to two contact pins 24 in the form of screws, which latter pass through holes in the insulating block 15 and bosses 18, to the underside of the hinged cover plate 20. The other ends of the screw contact pins 24 have attached to them the leads 25, 26, to the terminal contact pins 27, 28; 29 being insulating material in the form of beads threaded on to the leads 25, 26.

The tubes 6 are enclosed by a cylindrical casing 30, constructed in halves hinged together at 31, and adapted to be connected together at 32. The ends of the casing 30 are shaped to fit over the rings 7, 8. The casing 30 may be made of copper and polished internally, or of any other suitable metal, and, if desired, be provided internally with a polished copper coating or lining.

In this arrangement the receiving vessel is shown constructed of two concentric cylinders 33, 34, providing between them the annular water-holding space 35. The vessel is closed at the top 36, and fitted with a screw filling plug 37, having a vent 38. The branches 3 and 4 of the parts 1, 2, respectively, are attached to the inner cylinder 34, so that the water is free to circulate through the heating means from the water-holding space 35. The annular space 35 is closed at the bottom as indicated at 39. 40 is a tap fitted to the bottom of the outer cylinder 33, for drawing off the hot water as desired.

The receiving vessel is shown arranged upon and fixed to a base or stand comprising a short cylindrical piece 41; 42 being a bottom fixed thereto by brackets 43, and 44 being a lining of asbestos or other heat and electrical insulating material for the bottom 42. 45 are legs by which the base piece 41 is supported at a suitable height. The terminal contact pins 27, 28, and their shield and guide 46 are shown attached to the base piece 41.

In the arrangement shown in Fig. 3, the heating means are shown arranged inside a two-part hinged external casing 47, provided with a lining of heat-insulating material 48. The casing 47 is fitted with a top cover 49, held by a retaining flange 50, and a bottom cover 51 secured to the casing by screws 52. The contact pins 27, 28, and the guide and shield 46 are shown connected to and projecting from the bottom cover 51. The branches 3, 4, of the parts 1, 2, are shown fitted with elbow pieces 53, 54, for making connection with the outlet and inlet pipes 55, 56, respectively, leading to the cistern, tank or reservoir.

In Figs. 4 and 5, in which I illustrate the modified construction of the electrical elements, the inner and outer metal casings 57, 58, which surround the tubes 6—not shown—are hinged together along one edge 59 on a common hinge centre 60, and adapted to be connected together along the other edge 61. This permits the halves of the casings 57, 58, to be opened together, as indicated in dotted lines, or independently. The resistance wires 62 of the elements are in vertical sections and are wound in zig-zag formation around the curved or arcuate pieces of mica or other suitable insulating material 63, with mica or other suitable covering pieces 64 back and front, and with a backing of insulating material 65. The elements are placed next the surface of the inner casing 57, and tightly pressed against the same, while the inner casing 57 is in contact with the tubes 6 surrounded by it. In each half of the double casing 57, 58, there are arranged two elements 62 connected to common negative and positive terminals 66, 67.

What I claim as my invention and desire to protect by Letters Patent is:—

1. Electrical heating means for water and other liquids, including, in combination, top and bottom hollow parts, the top part being provided with an opening which forms the outlet for the heated water, and the bottom part with an opening which forms the inlet for the water to be heated, a plurality of tubes arranged in the form of a ring and placing said hollow parts in communication, through which tubes the liquid passes or circulates, an electrical heating element arranged concentrically in relation to the tubes and spaced apart therefrom so as to heat the liquid in its passage through said tubes, and a casing arranged around the circulating tubes between the top and bottom hollow parts, as set forth.

2. Electrical heating means for water and other liquids, including, in combination, top and bottom hollow parts, the top part being provided with an opening which forms an outlet for the heated water, and the bottom part with an opening which forms an inlet for the water to be heated, a plurality of tubes arranged in the form of a ring and placing said hollow parts in communication, through which tubes the liquid passes or circulates, an electrical heating element of annular formation in cross-section and disposed concentrically with the ring of water circulating tubes and spaced apart therefrom, so as to heat the liquid in its passage through said tubes, and a casing arranged around the circulating tubes between the top and bottom hollow parts, as set forth.

3. Electrical heating means for water and other liquids, including, in combination, top and bottom annular hollow parts, the top part being provided with an opening which forms the outlet for the heated water, and the bottom part with an opening which forms the inlet for the water to be heated, a plurality of tubes arranged in the form of a ring and placing said hollow parts in communication, through which tubes the liquid passes or circulates, an electrical heating element arranged centrally within the ring of circulating tubes and spaced apart therefrom so as to heat the liquid in its passage through said tubes, and a casing arranged around the circulating tubes between the top and bottom hollow parts, as set forth.

4. Electrical heating means for water and other liquids, including, in combination, top and bottom hollow parts, the top part being provided with an opening which forms the outlet for the heated water, and the bottom part with an opening which forms the inlet for the water to be heated, a plurality of tubes arranged in the form of a ring and placing said hollow parts in communication, through which tubes the liquid passes or circulates, electrical elements arranged around the ring of circulating tubes and spaced apart therefrom, so as to heat the liquid in its passage through said tubes, and a casing arranged around the circulating tubes between the top and bottom hollow parts, as set forth.

5. Electrical heating means for water and other liquids, including, in combination, top and bottom hollow parts, the top part being provided with an opening which forms the outlet for the heated water, and the bottom part with an opening which forms the inlet for the water to be heated, a plurality of tubes arranged in the form of a ring and placing said hollow parts in communication, through which tubes the liquid passes or circulates, electrical heating elements arranged concentrically around the ring of circulating tubes and spaced apart therefrom, and a casing arranged concentrically around the circulating tubes between the top and bottom hollow parts, in which the heating elements are housed, said casing comprising a pair of hollow hemi-cylindrical sections hinged together along one edge, each section comprising inner and outer metal parts hinged together along one edge, between which parts the electrical elements are positioned and secured, the sections being connected together along the other edge in such a way that either the outer part, or both parts, of each section together with the contained electrical elements can be opened about the hinge, as set forth.

ERLING BERNHARD ENOCHSEN.